Nov. 9, 1954 D. MITCHELL 2,694,141

RADIANT ENERGY SIGNALING SYSTEM

Filed Dec. 22, 1951 3 Sheets-Sheet 1

INVENTOR
D. MITCHELL
BY B. F. Stoddard
ATTORNEY

RADIANT ENERGY SIGNALING SYSTEM

Filed Dec. 22, 1951 3 Sheets-Sheet 2

INVENTOR
D. MITCHELL
BY B. F. Stoddard
ATTORNEY

Nov. 9, 1954 D. MITCHELL 2,694,141

RADIANT ENERGY SIGNALING SYSTEM

Filed Dec. 22, 1951 3 Sheets-Sheet 3

INVENTOR
D. MITCHELL

BY B. F. Stoddard

ATTORNEY

United States Patent Office 2,694,141

Patented Nov. 9, 1954

2,694,141

RADIANT ENERGY SIGNALING SYSTEM

Doren Mitchell, Martinsville, N. J., assignor to Bell Telephone Laboratories, Incorporated, New York, N. Y., a corporation of New York Application December 22, 1951, Serial No. 262,915

4 Claims. (Cl. 250—6)

This invention relates to radiant energy signaling systems and, more particularly, to channel-selecting equipment for use at a communication station in a signaling system employing several radiant energy communication channels.

The invention may be used with advantage in various types of signaling systems. It is especially useful in a two-way communication system having an unattended coin box controlled radio telephone station carried on a passenger vehicle adapted for movement over wide geographic areas wherein a plurality of immovable radio telephone stations are disposed at separated locations. For purposes of explanation, the invention is described hereinafter with reference to its application to a system of this type.

In such a communication system, each of the immovable radio telephone stations is designed to transmit and receive carrier waves over a two-frequency radiant energy communication channel comprising one frequency allocation for the transmission of carrier waves and another frequency allocation for the reception of carrier waves. To avoid interference between signals transmitted simultaneously by two or more of the fixedly located stations, each of the immovable stations is assigned a different two-frequency channel; that is, the two frequency allocations of a channel assigned to one station are different from the frequency allocations of the channels assigned to all of the other immovable stations. Due to this multichannel operation of the fixed stations, the operating frequencies of the radio transmitting and receiving equipments in the vehicular radio telephone station must be capable of being turned to the frequency allocations of each of the channels so that communication may be had between the mobile station and any one of the fixed stations. This can be effected by providing the mobile station with a plurality of different frequency-determining circuits and by employing selectives switching means for connecting any pair of these circuits to the transmitting and receiving oscillators at that station.

The movements of the vehicle may cause its radio telephone station to be carried into the immediate vicinity of first one of the fixedly located stations and then another with the result that the carrier energy transmitted from these fixed stations will be received by the mobile station with maximum strength. Similarly, the mobile station may on some occasions be carried to locations that are completely beyond the transmitting range of other of the fixed stations. Even though the mobile station may be near a fixed station, circumstances may be such as to prevent communication between the two stations. For example, the channel assigned to the fixed station may be busy or its signal-to-noise ratio may be unsatisfactory for communication purposes. Thus, it can be understood that there will be occasions when various conditions will be such that communication between the mobile station and some of the fixed stations can be had with optimum quality and, at the same time, cannot be had at all with other of the fixed stations. Consequently, it is desirable that the selective channel-switching means at the mobile station be limited in its operation at all times to the selection of an idle communication channel having good transmitting qualities. As there is no supervisory attendant on the vehicle to determine which of the several communication channels is the most satisfactory for communication purposes at a particular time, it is desirable that this function be performed automatically by equipment at the mobile station.

Accordingly, it is an object of this invention to provide automatic equipment at a radio telephone station for selecting, among several available radiant energy communication channels, an idle channel having good transmitting characteristics.

It is also an object of the invention to provide automatic means at a radio telephone station in a multichannel communication system for continuously examining the quality of a selected signaling channel and for effecting the selection of another channel when the first-mentioned channel becomes busy or when its quality becomes impaired.

An additional object is to automatically maintain the radio transmitting and receiving equipments at a radio telephone station in a multichannel communication system constantly tuned to an idle communication channel having satisfactory transmitting qualities.

These and other objects of the invention are accomplished in a manner now to be described briefly which includes providing a radio telephone station with means for continuously measuring the noise level or signal-to-noise ratio of the radiant energy received over a selected one of several available radiant energy communication channels. Automatic means are also provided for initating the operation of channel-switching means in response to either a busy condition or an objectionably noisy condition of the previously selected channel. When another channel is thus automatically selected, its noise content is examined by the first-mentioned means to determine whether the condition of the channel is satisfactory for communication purposes. If it is not satisfactory, the channel-switching operation and noise examination are repeated for successively selected channels until one is found that has good transmitting qualities. Since the station is equipped with a coin box telephone unit and since there is no supervisory attendant at the station, means are provided for controlling the operability of the station in accordance with coins deposited in the coin box. Collection of these coins can be effected by an operator at another radio telephone station. In the event this is not done promptly, means are provided for automatically collecting the coins at the expiration of an assigned interval of time.

These and other features of the invention are more fully discussed in connection with the following detailed description of the drawing in which.

Figure 1:
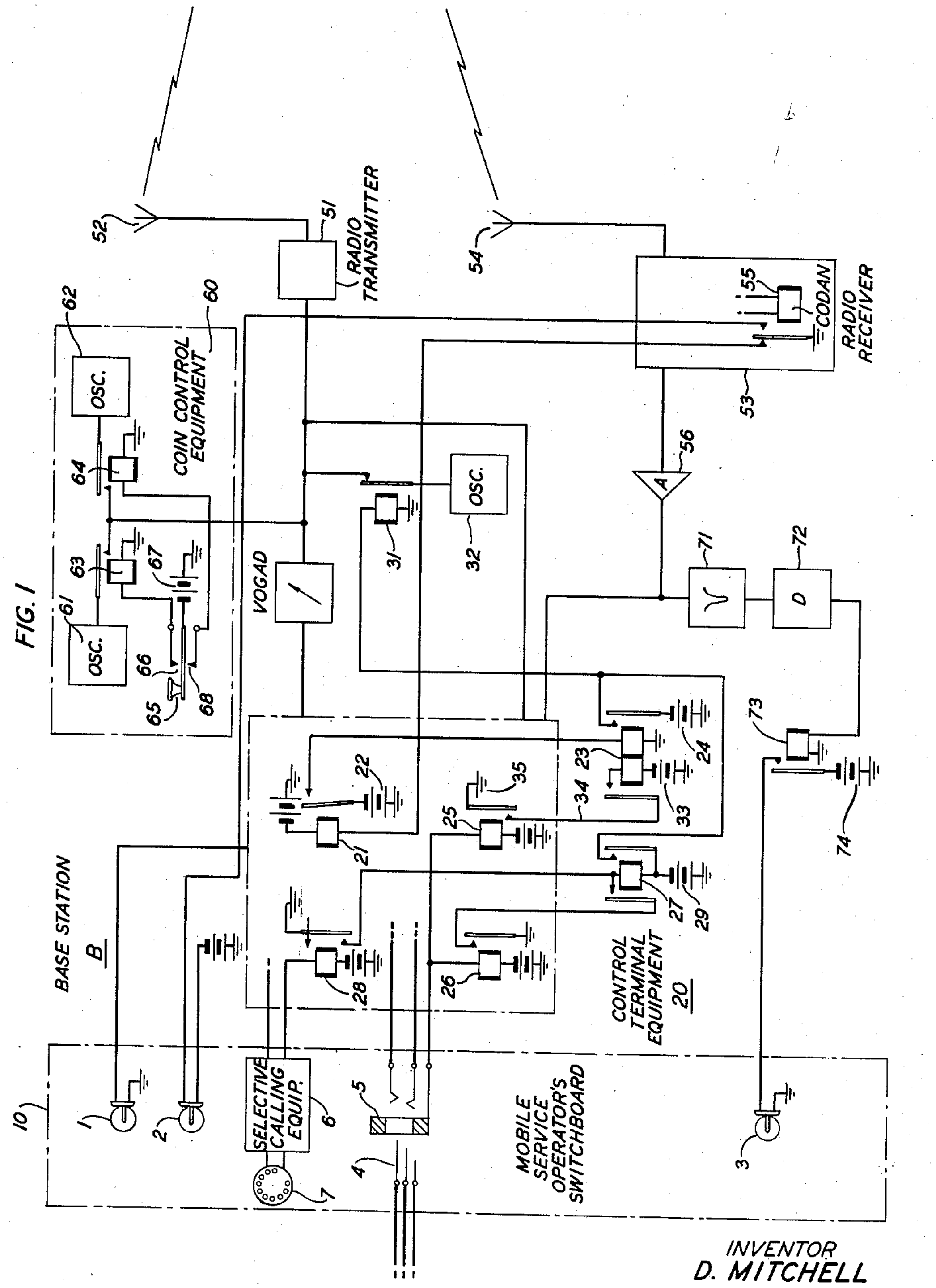
Fig. 1 is a circuit diagram of the equipment at a fixedly located radio telephone station.

In Fig. 1, the fixed located radio telephone station B is basically the same as the terminal station disclosed by A. C. Peterson in an article entitled "Vehicle radiotelephony becomes a Bell System practice" and published in Volume 25 of the "Bell Laboratories Record" on pages 137 to 141, inclusive. The terminal, or base, station B is shown to include a mobile service operator's switchboard 10 provided with a busy lamp 1, a line lamp 2, a warning lamp 3, a line plug 4, a line jack 5, and conventional selective calling equipment 6 having a dial 7. It is to be understood that the line plug 4 is connected in any suitable manner, such as by wire lines, to a telephone central office. The line jack 5, the selective calling equipment 6, and the lamps 1, 2, and 3 are connected by wire lines to the control terminal equipment 20 which comprises equipment elements that are described in detail hereinafter. The control equipment 20 is, in turn, connected by wire lines to the radio equipment which includes a radio transmitter 51, a transmitting antenna 52, a radio receiver 53, and a receiving antenna 54, all of conventional design. The radio receiver 53 is equipped with the usual codan relay 55 which is normally not energized but which, as is well known to those skilled in the art, becomes energized in response to the reception by the receiver 53 of carrier energy. In addition, the base station B is provided with coin control equipment 60 comprising two tone generators 61 and 62, two control relays 63 and 64, and a control key 65.

Figure 2:
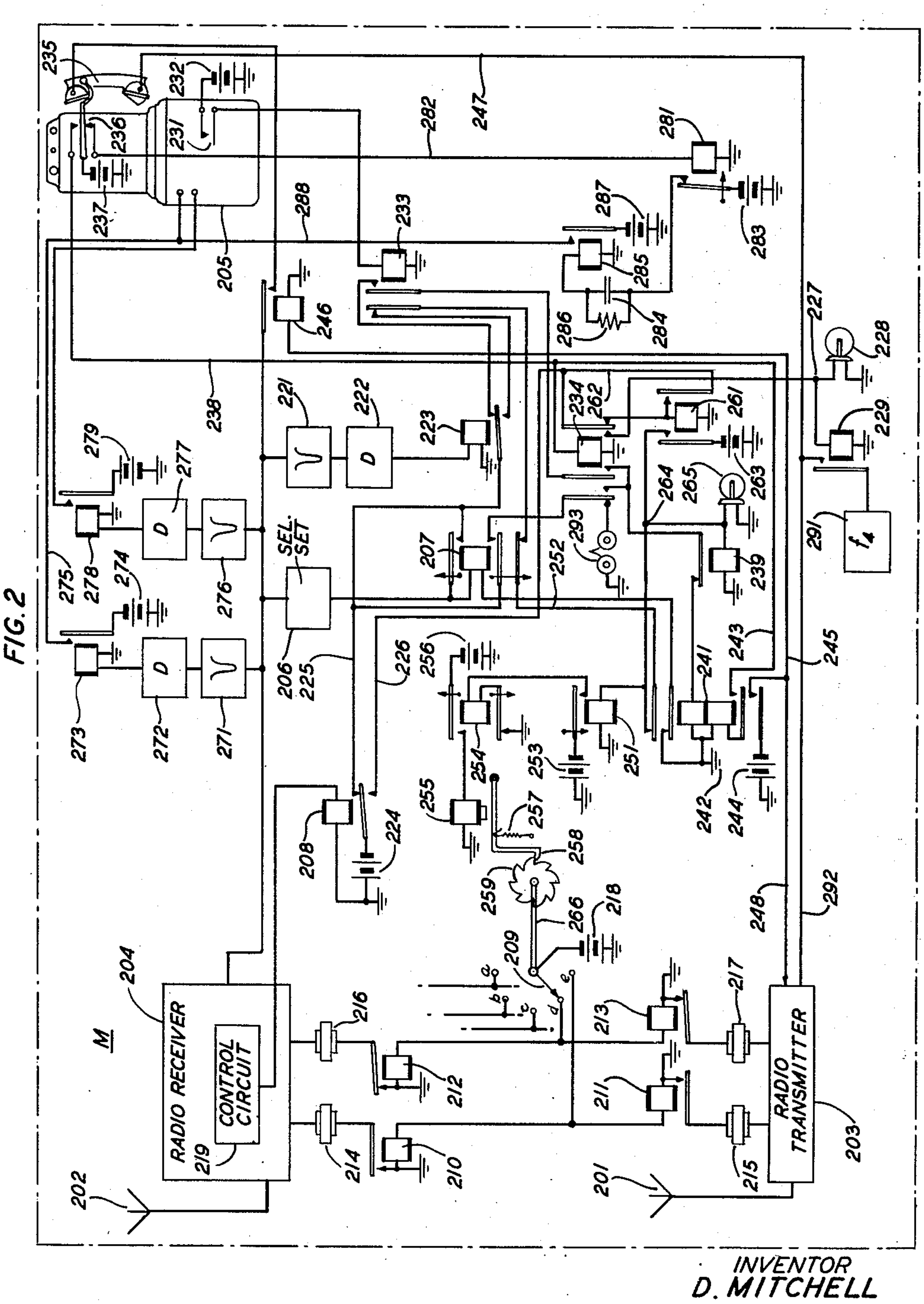
Fig. 2 is a circuit diagram of the equipment at a mobile radio telephone station.

The mobile radio telephone station M is shown in Fig. 2 to include a transmitting antenna 201 and a receiving antenna 202 connected respectively to a radio transmitter 203 and a radio receiver 204. Both the transmitter 203 and the receiver 204 are connectable to a coin box telephone unit 205 which may be of any suitable design, such as that disclosed in Patent 2,236,571 issued April 1, 1941 to F. A. Hoyt et al. The output from the receiver 204 is coupled to selective signal receiving equipment 206 which may be of the type described by B. P. Cottrell in an article entitled "Selective calling for mobile telephone service" and published on pages 32 to 34, inclusive, of "FM and Television," issue of January, 1948. As is explained in this article, the selective equipment 206 is designed to effect the energization of a call relay 207 in response to the reception by the receiver 204 of an assigned selective calling signal. A squelch relay 208 has its energizing winding connected to a conventional squelch control circuit 219 in the radio receiver 204. The squelch control circuit may be of any desired type, such as that described on page 653 of F. E. Terman's "Radio Engineers' Handbook." It is designed to cause the relay 208 to become energized when the quality of the carrier energy received by the receiver 204 is good, and to become unenergized when the quality of the received carrier energy is unsatisfactory.

The mobile station M is further provided with an electromechanically operated channel-selecting switch 209 for selectively energizing a plurality of channel-selecting relays 210, 211, 212, and 213 which, in turn, effect the selective connection of a number of quartz crystals 214, 215, 216, and 217 to frequency determining circuits associated with the transmitting and receiving oscillators incorporated in the transmitter 203 and receiver 204. Since each radiant energy signaling channel in this commuication system comprises two frequency allocations for the transmission of carrier waves in opposite directions, the relays 210 to 213, inclusive, are energized in pairs. Thus, when one of the relays, such as the relay 212, is energized to effect the tuning of the receiver 204 to one frequency allocation of a two-way communication channel, its associated relay 213 will also be energized to cause the transmitter 203 to become tuned to the companion frequency allocation of the same channel. It is to be understood that only two pairs of relays 210–211 and 212–213 have been shown for the purpose of simplification, and that additional pairs of relays and crystals can be added, if desired, for selecting additional signaling channels.

Figure 3:
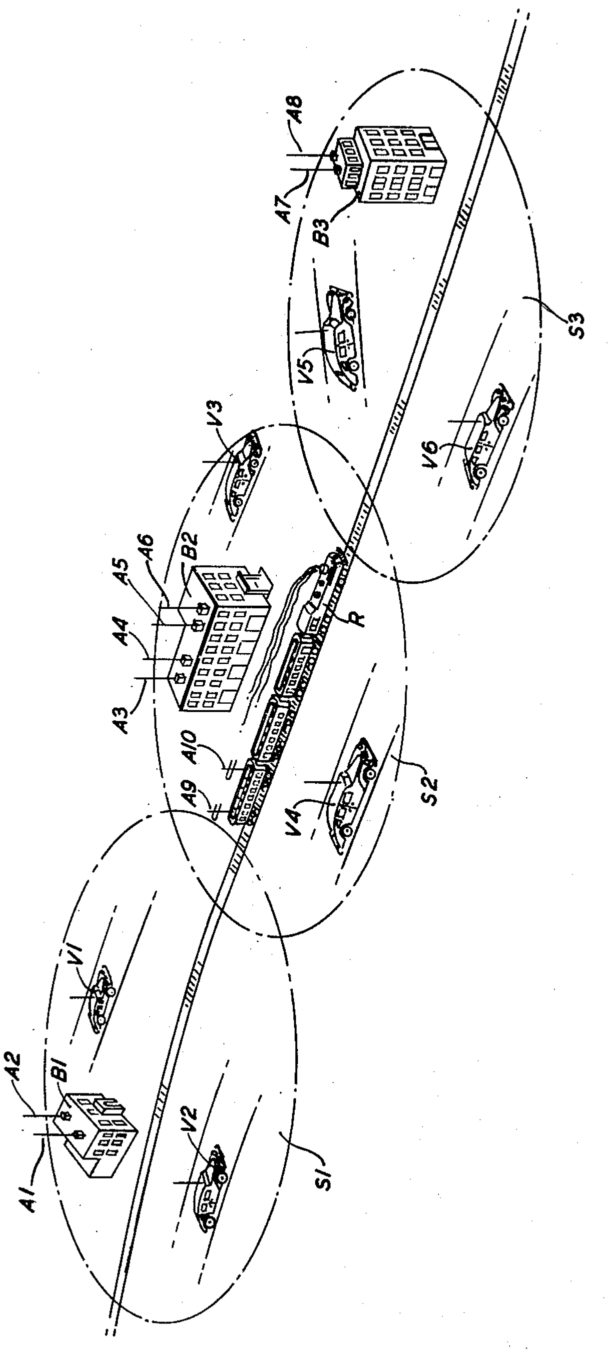
Fig. 3 is a pictorial representation of a radio telephone communication system having a plurality of fixedly located radio telephone stations and a plurality of mobile radio telephone stations.

It is also to be understood that this communication system may include a plurality of fixedly located base stations and that these stations may be essentially similar to the base station B, shown in Fig. 1, except that their radio transmitters and receivers will be tuned to signaling channels having different frequency allocations. In addition, it is to be further understood that the system may also include a plurality of mobile radio telephone stations which may be similar to the mobile station M, shown in Fig. 2, except that their selective signal receiving equipments will be responsive to other assigned selective calling signals. For example, the system may be similar to that shown in Fig. 3 wherein a mobile radio telephone station is carried on a passenger railroad train R adapted to travel through the service areas S1, S2, and S3 of three fixedly located base radio telephone stations B1, B2, and B3, respectively. The base station B1 is provided with transmitting and receiving antennas A1 and A2, respectively; the base station B2 is equipped with receiving and transmitting antennas A3 and A4, respectively, and also has auxiliary antennas A5 and A6 for use with supplementary radio telephone transmitting and receiving equipment thereat; and the base station B3 has receiving and transmitting antennas A7 and A8, respectively. The train station R is provided with transmitting and receiving antennas A9 and A10, respectively. Located within the service area of each base station B1, B2, and B3 are a plurality of other mobile radio telephone stations carried on vehicles V1 to V6, inclusive.

Referring now to Fig. 1, when the system is in an idle condition, the radio receiver 53 at the base station B receives no carrier energy. Consequently the codan relay 55 is not operated and its armature engages its outer contact to close an obvious circuit for energizing relay 21. Operation of the armature of the relay 21 disconnects battery 22 from the operating winding of relay 23. With the armature of relay 23 in its released position, battery 24 will be disconnected from the winding of relay 31 thereby causing idle tone from the tone generator 32 to be applied over the released armature of relay 31 to the radio transmitter 51. This idle tone is a low frequency tone, such as 4100 cycles. When the idle tone is applied to the radio transmitter 51, it modulates the carrier energy generated in the transmitter 51, and the resulting tone-modulated carrier is radiated by the antenna 52.

When the mobile station M is within operating range of the transmitter 51, the tone-modulated carrier energy will be received by the receiving antenna 202 and will be delivered to the radio receiver 204. Assuming that the channel-selecting relays 212 and 213 have been previously energized due to the application by the channel-selecting switch 209 of current from battery 218, then the crystals 216 and 217 will be connected respectively to the frequency-determining circuits associated with the receiving and transmitting oscillators in the receiver 204 and transmitter 203. Consequently, the receiver 204 will be tuned to the frequency allocation of the transmitter 51 at the base station B and the received tone-modulated carrier will be demodulated in a well-known manner and converted to audio frequency energy. Part of the audio frequency energy will be admitted by the idle tone filter 221 which has its output coupled to a rectifier 222. The resulting rectified idle tone will then be applied to the winding of a relay 223 to effect the operation of its armature. At the same time, another portion of the audio frequency energy will be applied to the above-mentioned squelch control circuit 219 in the radio receiver 204. As was mentioned above, if the quality of the received energy is satisfactory, the squelch relay 208 will be energized and will operate its armature thereby connecting battery 224 to conductor 225.

Now, if a person at the mobile station M, which may be located in the club car of a passenger railroad train, wishes to make a call to the base station B, he first deposits a coin in the coin box telephone unit 205. After traversing the coin runway, the coin reaches the coin hopper where it closes a set of contacts 231 in a manner similar to that disclosed in the abovementioned Hoyt et al. patent. The contacts 231 remain closed until the coins are collected at the end of the call as is described hereinafter. Closure of the contacts 231 connects battery 232 to relay 233 which thereupon operates its armatures. This closes a path extending from battery 224, over the operated armature of relay 208, along conductor 225, over the armature of relay 223 and the inner armature of relay 233, and then to the inner left armature of relay 234. Next, the telephone instrument 235 is manually removed from its holder 236, which is represented in the drawing as being in the form of a hook switch. This allows the upper hook switch contact to close thereby applying current from battery 237 along conductor 238 to the winding of relay 234 which operates its armatures, the inner left armature connecting battery 224 over the unoperated armature of relay 239 to the operating winding of relay 241.

Relay 241 now operates its armatures. The operation of the two top armatures of relay 241 perform functions that are described hereinafter. The operation of its inner bottom armature closes a locking circuit for relay 241 extending from ground 242 and along conductors 243 and 238 to battery 237. It is to be noted that this locking circuit is opened only when the telephone instrument 235 is replaced upon its holder 236. The operation of the outer bottom armature of relay 241 applies current from battery 244 along conductor 245 to the energizing winding of relay 246 which accordingly operates its armature to connect the radio receiver 204 to the telephone instrument 235. It is to be noted that the telephone instrument is connected to the radio transmitter 203 by a conductor 247. Current from battery 244 also travels along conductor 248 to a conventional starting circuit in the radio transmitter 203. This causes the radio transmitter 203 to produce carrier energy which is radiated from the antenna 201. Since it was assumed above that the crystal 217 is connected to the frequency-determining circuit coupled to the transmitting oscillator in the transmitter 203, then it follows that the carrier energy now produced by the transmitter 203 and radiated by the antenna 201 will be of the same frequency as that to which the radio receiver 53 at the base station B is tuned.

When this carrier energy is received by the radio receiver 53 at the base station B, it effects the energization of the codan relay 55 which operates its armature thereby opening the energizing circuit of relay 21. Relay 21 accordingly releases its armature to connect battery 22 to the operating winding of relay 23 which operates its armature to apply current from battery 24 to the winding of relay 31. In turn, relay 31 operates its armature to disconnect the idle tone generator 32 from the radio transmitter 51, thus discontinuing the modulation of its carrier with the idle tone. This causes all of the other mobile stations that are tuned to the channel assigned to station B to automatically start hunting for a different idle channel in a manner that is described hereinafter. Two functions are accomplished by this automatic hunting: firstly, the equipments at the other mobile stations will be instantly ready for use with an idle channel; and, secondly, they will be unable to interrupt or break-in on communication between station B and station M. Although the cessation of idle tone causes relay 223 at station M to release its armature and thereby open a portion of the circuit to the operating winding of relay 241, no resultant change in tuning is effected at station M because relay 241 has locked operated under the control of the hook switch 236 as was explained above.

Since the codan relay 55 at station B might release its armature if the carrier energy from station M should become weak or unsatisfactory, reconnection of the idle tone generator 32 to the transmitter 51 by such a cause is prevented in a manner now to be described. When the armature of the codan relay 55 was operated as described above, it closed a circuit for lighting the line lamp 2. Upon noticing the illumination of the line lamp 2, the operator at station B inserts the line plug 4 into the line jack 5 thereby energizing relay 25 which operates its armature to close the circuit through the locking winding of relay 23. This locking circuit extends from battery 33, over the operated left armature of relay 23, along conductor 34, and then over the operated armature of relay 25 to ground 35. This insures that the armatures of relays 23 and 31 will be held operated until the end of the call, and that the idle tone generator 32 will be held disconnected from the transmitter 51 for the same period of time.

The equipment at stations B and M is thus placed in condition for communication to take place between these stations. The operator at station B now proceeds to take the details of the call from station M and informs the person at that station of the amount of money required. The person making the call at station M then deposits the necessary coins in the coin box unit 205 and proceeds with his call.

At the termination of the call, the person at station M replaces the telephone instrument 235 on its holder 236. This opens the upper contact of the hook switch 236 thereby disconnecting battery 237 from the winding of relay 234 and the locking winding of relay 241.

The operator at station B should now collect the coins by operating the control key 65 to its collect position which closes its upper contact 66. This applies current from battery 67 to the winding of relay 63 which accordingly operates its armature to connect the collect tone generator 61 to the transmitter 51.

When the resulting collect tone-modulated carrier energy is received and demodulated at station M, the tone energy will be admitted by the filter 271 which has its output connected to a rectifier 272. The resulting rectified collect tone energy is then applied to the winding of a relay 273. Relay 273 consequently operates its armature to connect current from battery 274 along conductor 275 to the coin box unit 205 to effect the passage of the coins into a collect chute in a manner similar to that described in Patent 1,043,219 issued November 5, 1912 to O. F. Forsberg. This effects the opening of the set of contacts 231 thereby opening the energizing circuit of relay 233 and causing it to release its armatures. Release of the inner armature of relay 233 opens a portion of the circuit to the operating winding of relay 241, another portion having been previously opened by the release of the armature of relay 223 as was described above. The release of the outer armature of relay 233 completes a circuit for energizing relay 251. This energizing circuit extends from battery 224, over the operated armature of relay 208, along conductor 225, over the released armature of relay 223, the released outer armature of relay 233, the outer bottom released armature of relay 207, along conductor 252, the outer top released armature of relay 241, and then through the winding of relay 251 to ground. After being thus energized, relay 251 operates its armature to apply current from battery 253 to the winding of a self-interrupting relay 254. Relay 254, in turn, effects the energization of a stepping magnet 255 which initiates the automatic channel-seeking operations that are described in detail hereinafter.

In the event that the coins, instead of being collected, should be returned to the person placing the call at station M, such as would be the case if the call was not completed, then the operator at station B would operate the control key 65 to its return position which closes its lower contact 68. This applies current from battery 67 to the winding of relay 64 which operates its armature to connect the return tone generator 62 to the transmitter 51. When the return tone-modulated carrier energy is received and demodulated at station M, the return tone will be admitted by a filter 276 and then supplied to a rectifier 277. The resulting output energy from the rectifier 277 energizes a relay 278 which operates its armature to apply current from battery 279 to the coin box unit 205. Since the current from battery 279 has a polarity which is the opposite of that of the current from battery 274, it effects the passage of the coins into a refund chute in a manner similar to that described in the above-mentioned Forsberg patent. This effects the opening of the contacts 231 and the deenergization of relay 233 to produce the same result as that described above.

After having operated the control key 65 to either position, the operator at station B restores it to its initial neutral position and terminates the call by removing the line plug 4 from the line jack 5. This causes relay 25 to release its armature thereby opening the circuit through the locking winding of relay 23 which thereupon releases its armature to disconnect battery 24 from the winding of relay 31. Relay 31 releases its armature to connect the idle tone generator 32 to the radio transmitter 51 which accordingly now radiates its carrier energy modulated with the idle tone as was described above.

There may be occasions when the operator at station B will fail to collect the coins for various reasons, such as being busy placing other calls or due to the mobile station M traveling beyond the transmitting range of the base station B. In this event, it is desirable that the coins be automatically collected shortly after the telephone instrument 235 at station M is replaced on its holder 236. This will restore the equipment at station M to its normal idle condition and will also start the above-mentioned channel-seeking operation. According, a relay 281, which is of the slow-to-operate type having a time delay period of about 30 seconds, has its winding connected to the lower hook switch contact which becomes closed when the telephone instrument 235 is placed on the hook switch 236.

Closure of the lower hook switch contact applies current from battery 237 over conductor 282 to relay 281 which, at the expiration of its delay period, operates its armature to connect battery 283 to a condenser 284. This causes a brief pulse of current to flow through the winding of relay 285 which thereupon momentarily operates its armature. A large resistance 286 is bridged across the condenser 284 to permit it to discharge in a short interval when relay 281 is not energized. However, the magnitude of the resistance 286 is such as to prevent the passage of sufficient current to hold relay 285 energized in the event relay 281 should remain energized. The momentary operation of the armature of relay 285 applies a pulse of current from battery 287 along conductor 288 to the coin box unit 205 thereby effecting the collection of the coins and the opening of the contacts 231 in the same manner as that described above for the application of current from battery 274 to the coin box unit 205.

If, during the course of a call placed in the manner described above, the mobile station M travels to a position near the limit of the service area of the base station B, the quality of the received carrier energy will become unsatisfactory and will cause the squelch control circuit 219 in the receiver 204 to effect the deenergization of the squelch relay 208 which, accordingly, releases its armature. This disconnects battery 224 from conductor 225 and its associated circuit, and connects it instead to conductor 226. Current from battery 224 will now flow along conductor 226 and over the operated right armature of relay 234 to the junction point 227. Here the circuit divides; a portion of the current will light the warning lamp 228, and another portion will energize relay 229. Upon being energized, relay 229 operates its armature to connect a warning tone generator 291 to the conductor 292 which extends from the telephone transmitter in the telephone instrument 235 to the radio transmitter 203. This causes the carrier energy produced by the radio transmitter 203 to be modulated with the warning tone. In order to avoid interfering with any conversation which may be taking place, the generator 291 is designed to produce a tone having a frequency above the limit of audibility.

When the warning tone-modulated carrier energy is received and demodulated at the base station B, the warning tone will pass through the amplifier 56 and will be admitted by the filter 71 which has its output connected to a rectifier 72. The resulting rectified energy is then applied to the winding of a relay 73 which operates its armature to connect battery 74 to the warning lamp 3 thereby lighting the lamp 3. This directs the attention of the operator at station B to the advisability of transferring the call from the mobile station M to a different base station in an adjacent geographic area. This would be the next base station in the path of travel of the mobile station M. Accordingly, the operator at station B informs the caller at station M that there will be a delay or interruption in his call and requests him to replace his telephone instrument 235 on its holder 236. The operator at station B then collects the coins in the coin box unit 205 at station M in the manner described above, and transmits the necessary call information to the operator at the next base station.

The collecting of the coins at station M causes the contacts 231 to open thereby effecting the deenergization of relay 233 which releases its armatures to start the automatic channel-seeking operation mentioned above. When the mobile station M approaches the next base station, the carrier energy from that station will be received with sufficient strength to energize the codan relay 208 at station M. If this channel is idle, the idle tone relay 223 at station M will be energized in the manner described above. Since the operator at this second base station is expecting the call on the first idle channel in her service area, she will ring the mobile station M over that channel at an appropriate time and will then continue with the call in the same manner as though it were a new call. It is to be understood that the continuous examination of the quality of the carrier energy received over a selected channel may be performed by other types of circuits than the above-mentioned squelch control circuit. For example, the energization of relay 208 could be controlled by employing a signal-to-noise ratio measuring circuit, such as is disclosed in patent application Serial No. 126,481 filed November 10, 1949 by J. F. Laidig or in Patent 2,572,235 issued October 23, 1951 to W. R. Young, Jr.

In originating a call from a base station, such as station B, to a mobile station within its service area, such as the station M, it can be assumed that the idle tone transmitted from the base station will have caused the equipment at the mobile station to become tuned to the frequency allocations of the base station as was described above. Accordingly, the operator at the base station B inserts the line plug 4 into the line jack 5 thereby energizing relay 26 which operates its armature to connect ground to the left armature of relay 27. Although relay 25 also becomes energized at this time and operates its armature to connect ground 35 to the conductor 34, relay 23 will not operate its armatures at this time due to the circuit through its operating winding being held open by the operated armature of relay 21. Consequently, relay 31 will remain deenergized and the idle tone generator 32 will remain connected to the transmitter 51. This is necessary as, otherwise, the cessation of the idle tone would cause the channel-seeking equipment at the mobile station M to start hunting for another channel before it had received the selective calling signal.

The operator next rotates the dial 7 of the selective signaling equipment 6 at station B to transmit the particular selective calling signal which is assigned to the mobile station M. In order to simplify the drawing, the selective signaling equipment 6 has not been shown in detail as it is well known to those skilled in the art. It may be of any suitable design, such as that disclosed by C. N. Anderson and H. M. Pruden in an article entitled "Radiotelephone system for harbor and coastal services" and published on pages 245 to 253, inclusive, of the "Proceedings of the Institute of Radio Engineers," Volume 27, 1939. Operation of the selective calling equipment closes a circuit for energizing relay 28 which is of the slow-to-operate type having a delay period of about four seconds. At the end of this delay period, relay 28 operates its armature to close an obvious circuit for energizing relay 27. Relay 27 now operates its armatures and locks-up over its left armature and the operated armature of relay 26. Operation of the right armature of relay 27 connects battery 29 to the winding of relay 31 which thereupon operates its armature to disconnect the idle tone generator 32 from the transmitter 51.

The reception of the assigned selective calling signal at the mobile station M causes its selective signal receiving equipment 206 to effect the energization of the call relay 207 as was stated above. Consequently, relay 207 operates its armatures, the inner bottom armature closing a circuit for ringing the call bell 293. This circuit extends from battery 224, over the operated armature of relay 208 along conductor 225, inner bottom armature of relay 207, outer left armature of relay 234, and then through the call bell 293 to ground. Normally, the above-mentioned cessation of the idle tone would cause relay 223 to release its armature and close a circuit for energizing relay 251 which, in turn, would initiate the channel-seeking procedure described above. This is prevented by the operation of the outer bottom armature of relay 207 which opens this energizing circuit of relay 251. The operation of the top armature of relay 207 closes a locking circuit for this relay which extends from battery 224, operated armature of relay 208, along conductor 225, top contact and armature of relay 207, through the winding of relay 207, and then over the inner top armature of relay 241 to ground 242. Therefore, the mobile station M will remain tuned to this channel, and the call bell 293 will continue to ring as long as the squelch relay 208 remains energized or until someone at station M answers the call. In the event the quality of the received carrier energy should deteriorate, the squelch relay 208 would release its armature and thereby open the locking circuit of relay 207. Release of the armature of relay 208 would also initiate the automatic channel-seeking operations that are described hereinafter.

If the call is answered by someone at the mobile station M, such as the steward in the club car of a passenger train, the telephone instrument 235 will be removed from its holder 236. This permits the upper hook switch contact to close thereby applying battery 237 along conductor 238 to effect the energization of relay 234 which operates its armatures. The operation of the outer left armature opens the locking circuit of relay 207 and also stops the ringing of the bell 293. It should be noted that relay 207 is of the slow-to-release type so that, although its locking circuit is now open, it does not immediately release its armatures. Therefore, a circuit will now be closed from battery 224, operated armature of relay 208, conductor 225, inner bottom armature of relay 207, outer left armature of relay 234, released armature of relay 239, and then through the winding of relay 241 to ground 242. At the expiration of its delay period, relay 207 releases its armature to open this circuit through relay 241; but before this occurs, relay 241 has locked-up over its operated inner bottom armature, along conductors 243 and 238, and then through the hook switch to battery 237. Although the release of the outer bottom armature of relay 207 closes a portion of the circuit described above for energizing relay 251, another portion of this circuit is now opened by the operation of the outer top armature of relay 241. Thus, the mobile station M will remain tuned to the above-mentioned channel as long as the squelch relay 208 remains energized. The call now proceeds in the same manner as that described above except that there may be no coins deposited and therefore the relay 233 may not be energized.

As was stated above, the channel-switching means at the mobile station M is designed to select automatically another channel whenever the quality of the previously selected channel becomes impaired. This is accomplished in a manner that will now be described. Assuming that the mobile station M is in an idle condition and that it travels to a position near the edge of the service area of the base station B, then the quality of the received carrier energy will become unsatisfactory and will cause the squelch control circuit 219 in the receiver 204 to effect the deenergization of the squelch relay 208. Accordingly, relay 208 releases its armature to apply current from battery 224 along conductor 226 and then over the released right armature of relay 234 to the winding of relay 261. Relay 261 now operates its armatures and locks-up over conductor 262 and its right armature.

Operation of the left armature of relay 261 connects battery 263 to the junction point 264 where the circuit divides. A portion of the current from battery 263 will flow from the junction point 264 to the winding of relay 251 which is of the slow-to-operate type having a delay period of about five seconds. Another portion of the current from battery 263 effects the lighting of the busy lamp 265 to provide a visible indication at station M that the communication equipment is not at present in condition for the placing of a call. However, there might be occasions when a person at the mobile station M would ignore the indication provided by the lamp 265 and would deposit coins in the coin box unit 205 in an attempt to place a call. This would be objectionable for the reason that it would cause the radio transmitter 203 to radiate its carrier energy and thereby interfere with the orderly operation of the system. To prevent such unapproved starting of the transmitter 203, a third portion of the current from battery 263 is caused to flow through the winding of relay 239 which thereupon operates its armature to open the circuit through the energizing winding of relay 241. Thus, relay 241 cannot now become energized to effect the starting of the radio transmitter 203.

At the expiration of its delay period, relay 251 operates its armature to connect battery 253 to the winding of the self-interrupting relay 254 which is of the slow-to-release type having a delay period of about five seconds. The operation of the armature of relay 254 applies current from battery 256 to the stepping magnet 255 which accordingly operates its armature. This armature is normally held in its unoperated position by any suitable biasing means, such as a spring 257, and is provided at its end with a pawl 258. When this armature is moved to its operated position in response to the energization of magnet 255, it actuates the pawl 258 thereby rotating the ratchet 259 one step. Since the ratchet 259 and the channel-selecting switch 209 are securely mounted on a common shaft 266, the switch 209 will also be rotated one step to engage another of its associated contacts, namely, contact *e*. This will disconnect battery 218 from the windings of the channel-selecting relays 212 and 213 which will accordingly release their armatures to disconnect the crystals 216 and 217 from the frequency-determining circuits associated with the receiving and transmitting oscillators in the receiver 204 and transmitter 203, respectively. Current from battery 218 will now be applied to the next pair of channel-selecting relays, namely, relays 210 and 211.

Upon being thus energized, relays 210 and 211 operate their armatures to connect crystals 214 and 215 to the frequency-determining circuits in the receiver 204 and transmitter 203, respectively. Consequently, the receiver 204 and transmitter 203 will now be tuned to the two frequency allocations of the next radiant energy channel. Carrier energy received over this channel will be examined by the squelch control circuit 219 in the receiver 204. If the quality of this carrier energy is not satisfactory, the armature of the squelch relay will remain in its released position so that current from battery 224 will continue to hold the above-mentioned relays energized with the result that relay 254 will again operate its armatures to cause the magnet 255 to perform another stepping operation so that the switch 209 will engage its next contact *a*, the contacts *a*, *b*, *c*, *d*, and *e* being actually disposed in a circular arrangement. This will cause a different pair of crystals to be connected to the frequency-determining circuits in the receiver 204 and transmitter 203 thereby automatically tuning the receiver 204 and transmitter 203 to still another communication channel. It is to be noted that, since relay 254 is of the slow-to-release type, the magnet 255 is held energized for a period of time equal to the delay period of relay 254 thus permitting each channel to be examined for that period of time before another channel is selected. This is desirable because the mobile station M may be traveling at a fast speed and, for this reason, transmission conditions may change rapidly in a short time. As soon as a channel having good transmitting qualities is found, the squelch relay 208 will be energized and its armature will be operated to switch battery 224 from conductor 226 to conductor 225. This opens the locking circuit of relay 261 and causes it to release its armatures thereby extinguishing the busy lamp 265 and causing relays 239 and 251 to release their armature. The release of the armature of relay 251 disconnects battery 253 from the energizing circuit of relay 254 so that no additional channel-seeking operations will be made at this time, and the equipment at station M is thus ready for a call.

It may happen that the newly selected channel becomes busy with a call to another station before a call is made from station M. In this event, the incoming carrier will no longer be modulated with the idle tone. Consequently, relay 223 at station M will release its armature to close a circuit extending from battery 224, operated armature of relay 208, conductor 225, released armature of relay 223, outer released armature of relay 233, outer released bottom armature of relay 207, outer released top armature of relay 241, and then through the winding of relay 239 to ground. Relay 239 will now operate its armature to open the path through the energizing winding of relay 241 thereby preventing the starting of the radio transmitter 203. A portion of the current now flowing over this circuit will effect the lighting of the busy lamp 265. Another portion of the current from battery 224 will energize relay 251 thus initiating a resumption of the channel-seeking operations in the manner described above. As soon as an idle channel having good transmitting qualities is found, relay 223 will operate its armature to open the above-described circuit from battery 224. This extinguishes the busy lamp 265 and causes relays 239 and 251 to release their armatures thus placing the equipment at station M in proper condition for communication to take place.

This particular embodiment of the invention has been described in order to explain the principles and features of operation of the invention. It is to be understood that the invention is not limited to this specific system, but is applicable to various other types of systems. Although it is particularly useful when applied to communication systems having mobile radio telephone stations carried on various types of vehicles, such as trains, automobiles, boats, or airplanes, it may also be used with advantage in a radiant energy signaling system wherein all the stations are immovable. It is also to be understood that the invention is not necessarily restricted to use with a radio telephone station having a coin box unit as it can be used with a station that is provided with a conventional telephone handset. Various other modifications may be made without exceeding the scope of the invention which is to be limited only by the claims appended hereto.

What is claimed is:

1. A radiant energy signaling system having a plurality of radiant energy signaling channels allotted thereto for the transmission of carrier waves, each of said channels comprising a frequency allocation different from that of each of the other channels, said system including a radiant energy signaling station having only one antenna for receiving carrier waves transmitted over said channels, a radiant energy receiver at said station, coupling means for coupling said antenna to said receiver, channel-selecting means for tuning said receiver to any one of said channels, and automatic means for maintaining said receiver tuned to an idle channel having satisfactory transmitting qualities, said automatic means comprising control means for continuously examining the quality of carrier waves received over any selected one of said channels to determine whether its transmitting characteristics are satisfactory for signaling purposes, frequency-responsive means for determining whether said selected channel is idle, first electroresponsive means for maintaining said receiver tuned to a selected one of said channels as long as its transmitting characteristics are satisfactory and as long as it remains idle, and second electroresponsive means for effecting the operation of said channel-selecting means to select another channel, said second electroresponsive means being responsive to a determination by said control means that the transmitting qualities of the first selected channel have become impaired, and third electroresponsive means for effecting the operation of said channel-selecting means to select another channel, said third electroresponsive means being responsive to a determination by said frequency-responsive means that said selected channel is busy.

2. A radiant energy signaling system comprising in combination a plurality of fixedly located radiant energy signaling stations each having an antenna for radiating carrier waves, the mean frequency of the carrier waves radiated by each of said antennas being different from that of the carrier waves radiated by each of the other antennas, the waves from each of said antennas being radiated throughout a service area have different geographic boundaries from those of the service areas covered by each of the other antennas, a vehicle adapted for movement through said service areas, a mobile radiant energy signaling station carried on said vehicle for movement therewith, said mobile station having only one antenna for receiving said carrier waves, a radiant energy receiver and a radiant energy transmitter at said mobile station, starting means at said mobile station for starting said transmitter, a warning indicator at said mobile station, coupling means for coupling said mobile receiver to said mobile antenna, selective tuning means for selectively tuning said mobile receiver to any one of said mean carrier frequencies, control means at said mobile station for continuously examining the quality of carrier waves received by said mobile receiver while said mobile station moves throughout said service areas, and electroresponsive means for disabling said starting means and for energizing said warning indicator, said electroresponsive means being actuated in response to a determination by said control means that the quality of the received carrier waves has deteriorated.

3. A radiant energy signaling system comprising in combination a first radiant energy signaling station having a radiant energy receiver for receiving carrier waves, a plurality of radiant energy base signaling stations each having a transmitter for radiating carrier waves, the mean frequency of the carrier waves radiated by each of said transmitters being different from that of the carrier waves radiated by each of the other transmitters, each of said base stations having a source of idle tone electric energy and means for connecting said idle tone source to the transmitter thereat for modulating its carrier waves, selective tuning means for selectively tuning the receiver at said first station to the mean frequency of the carrier waves radiated from any one of said base stations, first electroresponsive means for operating said selective tuning means to change the tuning of the receiver at said first station to the mean frequency of the carrier waves radiated from another of said base stations, control means at said first station for continuously examining the quality of carrier waves received by the receiver at said first station from a base station to which it has been selectively tuned, first circuit means for maintaining the receiver at said first station tuned to a selected mean carrier frequency as long as the quality of the carrier waves examined by said control means is satisfactory, second electroresponsive means at said first station for conditioning said first circuit means for operation, and second circuit means at said first station for separating said idle tone energy from the received modulated carrier waves, said second electroresponsive means being operated by said separated idle tone energy.

4. A radiant energy signaling system in accordance with claim 3 and having means at each base station for disconnecting its idle tone source from its associated transmitter in response to a busy condition at that station, said second electroresponsive means at said first station being responsive to the removal of the idle tone from the received carrier waves for discontinuing the tuning maintenance established by said first circuit means and for effecting the operation of said selective tuning means to tune its associated receiver to the mean frequency of carrier waves radiated from another of said base stations.

References Cited in the file of this patent

UNITED STATES PATENTS

| Number | Name | Date |
|---|---|---|
| 1,470,747 | Juley | Oct. 16, 1923 |
| 1,572,756 | Smythe | Feb. 9, 1926 |
| 1,709,076 | Jammer | Apr. 16, 1929 |
| 2,101,668 | Bishop | Dec. 7, 1937 |
| 2,231,806 | Goldsborough | Feb. 11, 1941 |
| 2,283,523 | White | May 19, 1942 |
| 2,358,448 | Earp | Sept. 19, 1944 |
| 2,384,456 | Davey | Sept. 11, 1945 |
| 2,521,696 | DeArmond | Sept. 12, 1950 |
| 2,523,315 | Mayle | Sept. 26, 1950 |
| 2,529,410 | Newstedt | Nov. 7, 1950 |
| 2,564,048 | Bartelink | Aug. 14, 1951 |
| 2,649,541 | McDavitt | Aug. 18, 1953 |

OTHER REFERENCES

"Experimental Radio-Telephone Service for Train Passengers" by N. Monk, Proc. IRE for August 1951, pp. 873–881.